(12) United States Patent
Torgersrud et al.

(10) Patent No.: US 9,231,954 B2
(45) Date of Patent: Jan. 5, 2016

(54) COMMUNICATIONS SYSTEM FOR RESIDENTS OF SECURE FACILITY

(71) Applicant: Telmate LLC, San Francisco, CA (US)

(72) Inventors: Richard Torgersrud, San Francisco, CA (US); James Dominick Alessio, Berkeley, CA (US); John Satori Yamasaki, San Francisco, CA (US); Nick Garcia, Oakland, CA (US); Devon Brooke Lindsey, San Francisco, CA (US)

(73) Assignee: Telmate, LLC

( * ) Notice: Subject to any disclaimer, the term of this patent is extended or adjusted under 35 U.S.C. 154(b) by 47 days.

(21) Appl. No.: 13/842,015

(22) Filed: Mar. 15, 2013

(65) Prior Publication Data

US 2014/0282896 A1   Sep. 18, 2014

(51) Int. Cl.
*H01L 29/06* (2006.01)
*H04L 29/06* (2006.01)

(52) U.S. Cl.
CPC .............. *H04L 63/101* (2013.01); *H04L 63/02* (2013.01)

(58) Field of Classification Search
None
See application file for complete search history.

(56) References Cited

U.S. PATENT DOCUMENTS

| | | | | |
|---|---|---|---|---|
| 5,537,102 | A * | 7/1996 | Pinnow | 340/5.8 |
| 6,853,739 | B2 * | 2/2005 | Kyle | 382/115 |
| 7,865,386 | B2 | 1/2011 | Sarkar | |
| 8,629,755 | B2 * | 1/2014 | Hashim-Waris | G06Q 30/0235 340/10.1 |
| 8,699,998 | B2 * | 4/2014 | Sprigg | H04L 51/12 455/410 |
| 8,965,416 | B2 * | 2/2015 | Moshir | G06Q 50/34 455/405 |
| 2002/0067272 | A1 * | 6/2002 | Lemelson et al. | 340/573.4 |
| 2002/0120573 | A1 * | 8/2002 | McCormick | G06Q 50/22 705/50 |
| 2004/0146048 | A1 * | 7/2004 | Cotte | 370/352 |
| 2008/0161027 | A1 | 7/2008 | Benco et al. | |
| 2008/0222127 | A1 * | 9/2008 | Bergin | 707/5 |
| 2009/0189736 | A1 * | 7/2009 | Hayashi | G06F 21/32 340/5.81 |
| 2009/0222329 | A1 * | 9/2009 | Ramer et al. | 705/10 |
| 2009/0265552 | A1 * | 10/2009 | Moshir et al. | 713/168 |
| 2010/0040007 | A1 | 2/2010 | Itagaki et al. | |
| 2010/0180031 | A1 * | 7/2010 | Cacheria, III | G06Q 10/1057 709/225 |
| 2011/0153380 | A1 * | 6/2011 | Velusamy | 705/7.19 |
| 2012/0253868 | A1 | 10/2012 | Ach et al. | |
| 2012/0289206 | A1 | 11/2012 | Shim | |
| 2012/0309437 | A1 | 12/2012 | Salonen | |
| 2013/0002433 | A1 * | 1/2013 | Wilmeth et al. | 340/573.4 |
| 2014/0162598 | A1 * | 6/2014 | Villa-Real | H04M 1/66 455/411 |

OTHER PUBLICATIONS

Sankaran, Siva R.; Bui, Tung. A Web-Based Correctional Telemedicine System with Distributed Expertise. Proceedings of the 33rd Annual Hawaii International Conference on System Sciences, 2000. http://ieeexplore.ieee.org/stamp/stamp.jsp?tp=&arnumber=926798.*

(Continued)

*Primary Examiner* — Jeremiah Avery
(74) *Attorney, Agent, or Firm* — Venable LLP; Jeffri A. Kaminski; Leslie A. Lal-Lee (57) ABSTRACT

A system and a method are provided for two-way communications, automated request handling, and push notifications, via SMS, MMS, IM, email, and other electronic messaging systems, between (1) residents confined to a secure facility, such as a jail or a prison, and (2) persons located outside the secure facility who have friendly or family relationships with the confined residents.

13 Claims, 4 Drawing Sheets

(56) References Cited

OTHER PUBLICATIONS

Armstrong, Natalie; Losavio, Michael; Keeling, Deborah. Digital System, Evidence & Forensic Issues in Correctional Environments. 2010 Fifth IEEE International Workshop on Systematic Approaches to Digital Forensic Engineering. http://ieeexplore.ieee.org/stamp/stamp.jsp?tp=&arnumber=5491963.*

Perusco, Laura; Michael, Katina. Control, Trust, Privacy, and Security: Evaluating Location-Based Services. Technology and Society Magazine, IEEE. vol. 26, issue 1. Pub. Date: 2007. http://ieeexplore.ieee.org/stamp/stamp.jsp?tp=&arnumber=4135773.*

"Matching a SMS Reply to the Original SMS Sent", SMS & MMS Technical Form, Jun. 2, 2006, pp. 1-8.

"Two-Way Messaging and Matching a Response to an Outbound Message", Stack Overflow, pp. 1-3.

* cited by examiner

COMMUNICATIONS SYSTEM FOR RESIDENTS OF SECURE FACILITY

This disclosure relates to a system for providing and arranging for communications with and between (1) residents of a detention environment, who use commercial, off-the-shelf or other communications terminals, and (2) persons who reside outside the facility, and who use cellular telephones or other terminals capable of using short message service (SMS), multimedia message service (MMS), instant messaging (IM), and the like electronic messaging protocols.

BACKGROUND

Because of security requirements and other considerations, residents of a detention environment are typically limited as to which persons outside of the environment they may communicate with. As such, direct, uncontrolled communications using standard telephone systems, including SMS and MMS messaging and IM, are unsuitable, and administrators of detention environments may go to great lengths to prevent such communications.

Persons wishing to communicate with individuals residing inside detention environments have limited methods and time-windows in which to have telephone and/or video calls. Outside persons normally cannot call inmates of detention environments, but can only leave voicemails, or use traditional mail or participate in visitation day. There is a need for a more convenient way for outside persons to communicate with inmates while maintaining the safety and security features that detention environments require.

Some of the limitations associated with detention environment communications result from the rules promulgated by the detention environments, some limitations result from limited availability of visitation rooms or telecommunications equipment, or funds available, while others result from conflicting schedules of the residents of the detention environment and those on the outside. Historically, staff personnel at detention environments have needed to be personally and individually involved in arranging visitations for the confined residents, and there are no suitably automated systems for managing and overcoming the above barriers.

SUMMARY

Persons residing inside detention environment, which may be a jail, prison, detention center, detention facility, or other secure facility, typically have extremely limited access to communications with persons outside the facility. Nevertheless, frequent communications with friends, family members, and others outside the facility have been shown to improve the morale of confined persons, reduce their recidivism, decrease their involvement with gambling, fighting, and other deleterious activities, and generally improve their chances of rehabilitation.

Consequently, it is desirable to provide a system for increasing the opportunity, convenience and frequency by which residents of a detention facility can communicate with people outside the facility. It is also desirable to provide for other communications capabilities that keep persons outside the facilities better apprised of the residents' status. In particular, it is highly desirable to provide a secure and controlled system by which residents of a secure facility can have more frequent and convenient contact with properly authorized persons outside the facility.

According to this disclosure, a system terminal (or kiosk) may be located inside the secure facility, computing clusters may be located in a secure data center outside the facility, and interconnections may be provided within public telephone, cellular phone, and/or public Internet networks. The computing clusters may be configured, with suitable hardware and software, to manage communications between the residents of multiple secure facilities and persons outside the secure facilities.

This disclosure establishes a broad, yet focused set of communications tools that serve to increase communications between residents of secure facilities and their friends and family members residing outside such facilities. The communications may have the external convenience of typical SMS communications between two persons, even though they are converted from or to the public SMS or email networks to or from a separate communications system respectively using one or more terminals inside the detention environment. This disclosure is not limited, however, to SMS communications. Among other things, this disclosure may be used in connection with communications to and from uniquely addressed email addresses, including emails to and from detainees.

According to one aspect of this disclosure, automated communications (push notifications) may be initiated by computing clusters that serve the terminals that are inside the secure facilities. The push notifications may be generated automatically in response to events pertinent to the residents of the secure facilities, such as notifications about low bank or credit union account balances, upcoming court hearings and release dates, movement between facilities, gaps in communications, and requests (by any party) to establish communications through other channels.

This disclosure also relates to a system for originating manual and automated communications from wired or wireless terminals inside secure facilities, or data centers serving secure facilities, to public or private telephone networks and/or other networks such as the Internet. The system may be configured to verify that the resident is authorized to communicate with the recipient of an automated communication, prior to each such communication, and a communication may be pushed to the recipient only after the authorization is verified. The resident may be a prisoner or some other person who is detained within the detention environment.

This disclosure also relates to a method for accepting responses to multiple different queries originating from the same mobile telephone number or SMS short code and pertaining to a resident of a secure facility. As the method is performed, one or more unique sets of numbers or characters may be generated for each message requiring a response, and each set of numbers is made to be unique for a predetermined period of time for the end-user to which they are delivered, with respect to that query, even if repeated in multiple messages. The assigned response methods, keywords, characters, or numbers are guaranteed to be unique to the query within a specified time period.

According to one aspect of this disclosure, a phone number, email, SMS or MMS could have a unique string of characters that allow the system to route the communication to the intended individual, and the operator of the system could potentially bill (charge) for the transaction. For example, an SMS may have a @chr001 shortcode to route and bill the message correctly. An email to chr001@gettingout.com would route to the same detainee. The system may also be configured so that a caller calls a single 800 number and then after a prompt, enters a unique series of digits, for example, "5464548" to leave a voicemail without having to search a directory of detainees.

This disclosure also relates to a method by which a person outside a secure facility, with whom a particular resident of a secure facility is authorized to communicate, can request an electronic communication with the resident via electronic message (e.g., SMS, MMS, IM or email). Moreover, this disclosure relates to a method by which a first person, who is outside a secure facility (or a resident of the secure facility) can request that a particular second person establish an electronic relationship with the first person.

This disclosure also relates to a method by which a person outside a secure facility can communicate with a resident of the secure facility using SMS, MMS, IM, email or similar electronic messaging. As the method is performed, messages are converted to a format suitable for delivery to and from terminals located inside the secure facility by a data center located outside the facility, and the system verifies that the resident is authorized to communicate with the outsider prior to each communication.

This disclosure also relates to a method by which a person outside a secure facility can post a message or the like, or upload photos, audio, videos, and other electronic multimedia to an electronic message board pertaining to a specific resident of the detention environment, or pertaining to all residents associated with the outsider. The uploading does not occur, however, until the automated system verifies that the detained resident is authorized to communicate with the outsider. If desired, the verification may occur before each such upload.

This disclosure is not limited to the communication of text and video messages but also relates to a system by which a person outside a secure facility can provide funds to a resident of the facility via an electronic message. According to one aspect of this disclosure, messages may be automatically generated when a bank or credit union account balance drops below a set threshold, such as a fixed dollar amount, or an amount sufficient to cover a visit of a specified duration.

The systems and methods described in this disclosure may be specifically tailored to providing two-way notifications between a first party residing inside a secure facility, and a second party residing outside the secure facility. Because the first party may not have access to a personally-owned telecommunications terminal and must rely on using a pool of terminals shared with other residents, different addressing and alerting schemes must be used. Because the first party also typically lacks direct access to funds, he is also dependent upon one or more parties on the outside to deposit funds into a remote visitation account.

DETAILED DESCRIPTION

Figure 1:
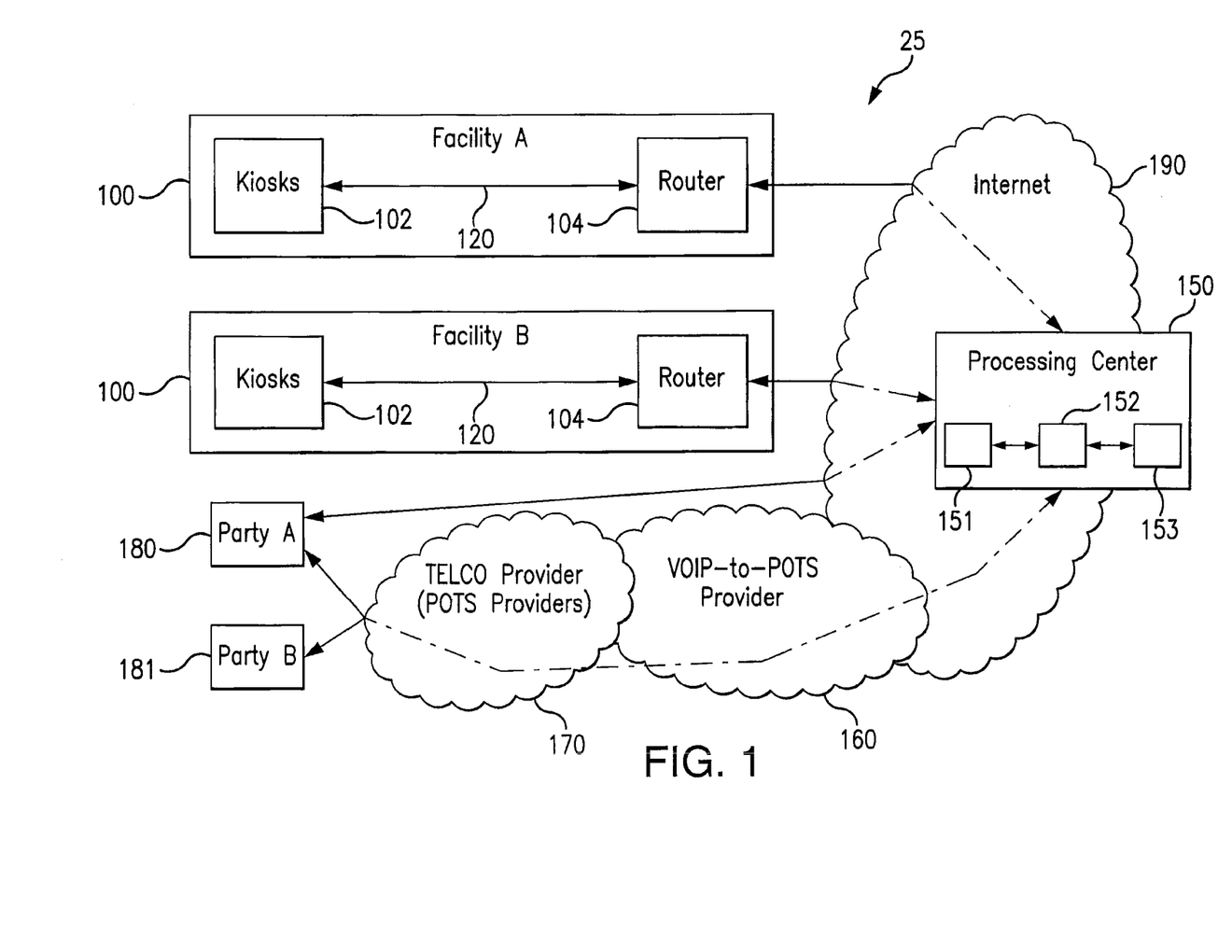
FIG. 1 is a schematic view of a communications system constructed in accordance with an embodiment of this disclosure.

Referring now to the drawings, where like reference numerals designate like elements, there is shown in FIG. 1 a system 25 that is constructed in accordance with a first embodiment of this disclosure. The system 25 includes an interactive audio/video platform that has kiosks 102 for providing administrative services at multiple secure facilities 100. The platform also includes a processing center 150 that is connected to one or more facilities 100 through a network such as, e.g., the Internet 190. The secure facilities 100 that utilize the system 25 may be any that require voice, video, and/or information services, especially those with strict security requirements and large traffic volumes, including secure facilities such as prisons and other government detention facilities. In a preferred embodiment, each facility 100 contains at least one kiosk 102. In other embodiments, one or more of the facilities 100 contains at least one kiosk.

Each kiosk 102 is connected to a router 104 via a networking link 120. The routers 104 are configured to communicate with the processing center 150, which may be distributed (151, 152, 153) across several locations. The routers 104 each transmit communications received from the kiosks 102 to the Internet 190, and exchange Internet protocol (IP) packets bidirectionally between the processing center 150 and the resident of the respective facility 100. The processing center 150 includes application hardware (FIG. 4) and software for data processing and other functions described below.

As illustrated in FIG. 1, the processing center 150 is distributed across multiple clusters 151, 152, 153, 154 (FIG. 2), which may or may not be geographically diverse. Each cluster 151, 152, 153, 154 hosts multiple nodes, including an applications node 257, a database node 258, and a call processing node 256. The clusters 151, 152, 153, 154 communicate with each other via the Internet 190 or dedicated connections 210, 212. Information in any one database node 256, 257, 258 can be shared among the clusters 151, 152, 153, 154.

Figure 2:
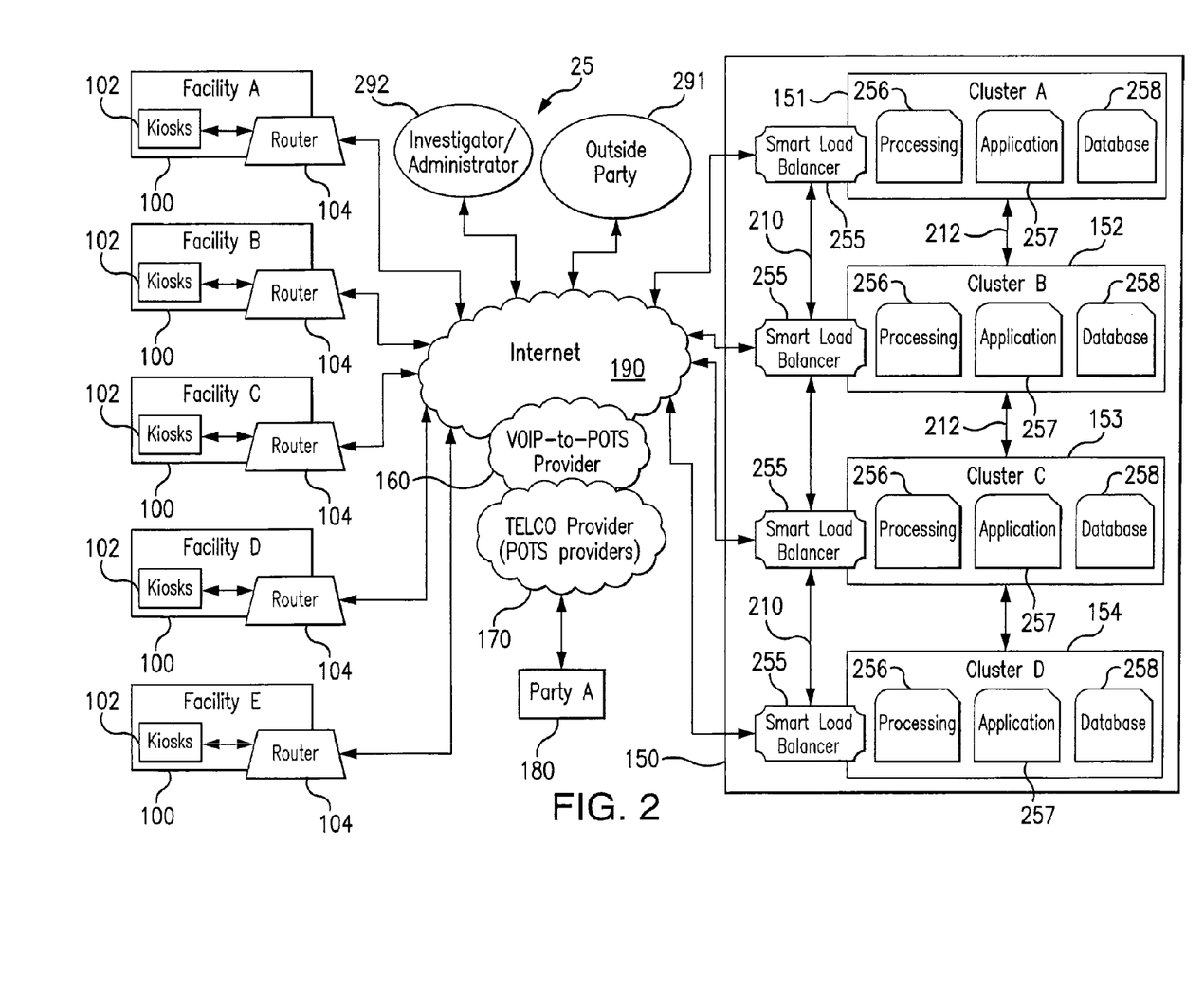
FIG. 2 is another schematic view of the communications system of FIG. 1.

Data storage and retrieval can be performed across the several clusters 151, 152, 153, 154, and the clusters 151, 152, 153, 154 can provide fail-over for one another. If desired, the router 104 at each facility 100 may be configured to communicate with another cluster 151, 152, 153, 154 if a primary cluster 151, 152, 153, 154 is or becomes unavailable. As illustrated in FIG. 2, one or more smart load balancers 255 may be used to manage the clusters 151, 152, 153, 154 such that the resources of the respective cluster nodes 256, 257, 258 (which may each include multiple computers) can be reallocated as processing needs require.

As illustrated in FIG. 1, the processing center 150 routes communications from facility residents, who use the kiosks 102, to outside parties 180, 181. That is, the processing center 150 routes voice, text and/or video traffic from facility kiosks 102 to and from their ultimate intended destinations. To route voice-communications traffic, the processing center 150 communicates via interne protocol (IP) to a VoIP-to-POTS provider 160, which converts voice over IP (VoIP) communications to plain old telephone service (POTS) communications, and vice versa. Companies who provide VoIP-to-POTS services include Paetech, Level 3, and Verizon. After converting the VoIP signal to a POTS signal, the VoIP-to-POTS provider 160 provides the communication to a telecommunications provider 170 which routes the call to the intended one of the called parties 180, 181.

The processing center 150 may also be used to route video and text communications. Communications that are received from the facility routers 104 may be stored or cached on web servers in the processing center 150 or on third-party web servers. In addition to storing communications routed through the processing center 150, the processing center 150 may be configured to receive and store recordings of local communications (e.g., local video communications) that have been recorded at the facilities 100. The communications that are stored at the processing center 150 can be accessed by an investigator or administrator 292 (or another authorized person 291 outside the secure facility 100) using a web browser on a computer connected to the Internet 190. The processing center 150 also may be configured to receive a request for data from the routers 104, such as hypertext transfer protocol (HTTP) requests, and return information for the routers 104, such as information on a third-party website.

Figure 3:
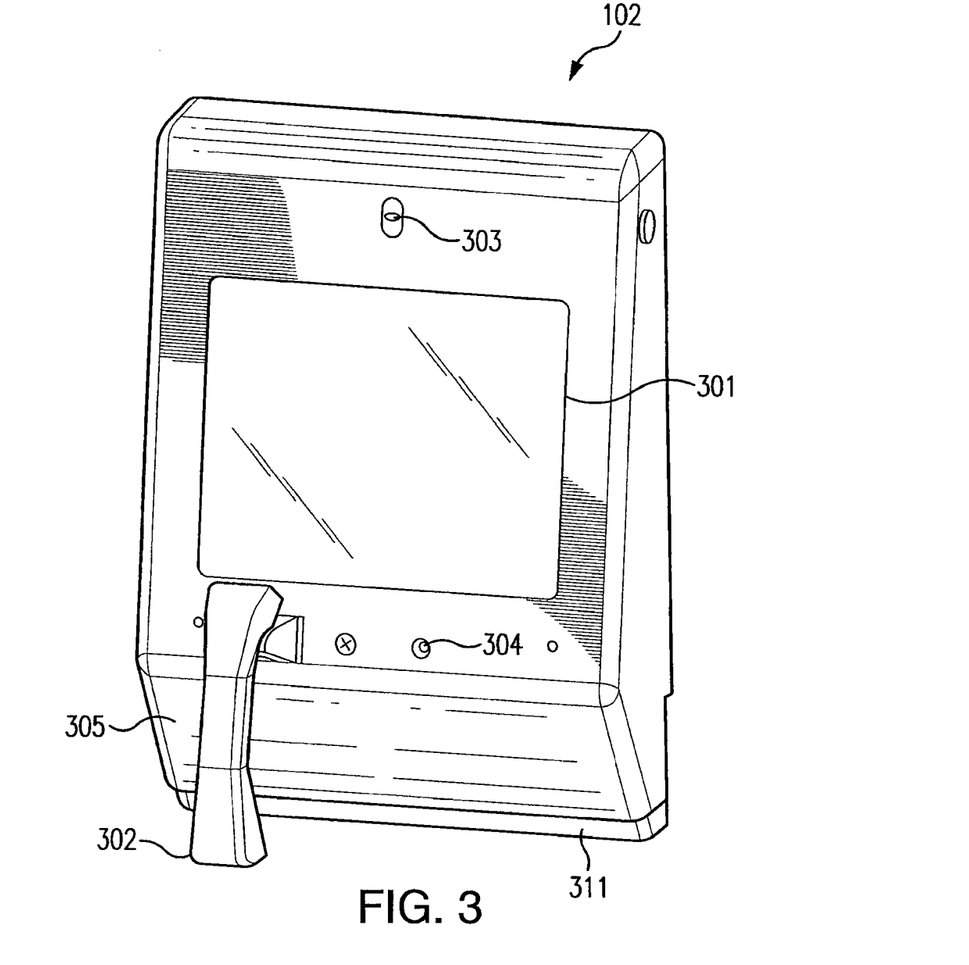
FIG. 3 is a perspective view of a communications device for the communications system of FIG. 1.

According to a preferred embodiment, each kiosk 102 is in the form of the interactive audio/video terminal shown in FIG. 3. The illustrated kiosk 102 has an integrated camera 303 that can be used for video communications and/or for user authentication via facial recognition. The kiosk 102 also may have a touch screen 301 for displaying images and/or for detecting the presence and location of a user's touch within its display area. The touch screen 301, may be, for example, a 15-inch capacitive or resistive touch screen display. In the illustrated embodiment, the screen 301 serves as the main kiosk interface with the user. A telephone handset 302 connected to the kiosk 102 may have a speaker and a microphone. The handset 302 can be used to issue voice commands and provide voice authentication as required, and it may be used for voice and video communications, among other things.

The illustrated handset 302 is optional, as the kiosk user may instead plug in headphones (not illustrated) with an in-line microphone using one or more stereo headphone jacks 305 (and/or a speakerphone). If desired, the headphone jacks 305 may be located to the side of the kiosk 102 or behind a movable panel 311. The panel may be locked in a position exposing the jacks, or in a position blocking them, depending on the preferences of the secure facility. A USB interface (not illustrated) optionally located behind the movable panel may be used for system diagnostics by technicians or to synchronize files to an external device, such as a portable media player. The kiosk 102 also may have a speaker 304 that provides audio output.

In operation, the audio/video terminals 102 may serve several purposes aside from providing the video camera 303 and display 301 used to conduct visitations. Such purposes include sounding and/or displaying notifications of incoming calls and/or requests; and allowing residents of the secure facility 100 to initiate requests for immediate or scheduled visitations, and to send and receive text-, audio-, and video-based messages or combinations thereof using the microphone, speaker, video camera 303, and a keyboard displayed on the screen 301.

Separately located at one or more of the secure facilities 100, as an optional component, are facility-owned or -operated computer systems that operate a jail management system (JMS). A JMS has one or more databases, computer terminals, and other components that record, store, and update the status of residents of the secure facility, including but not limited to each resident's activity within the facility, intake and expected release dates, good and bad behavior records, medical records, pending charges, past convictions, known gang affiliations, legal representation, and authorized and/or prohibited visitors. The JMS typically has the ability to export some or all of this data to third-party computer systems via suitable Internet connections. The detention environment 100 may have access to and/or operate one or more of the location-based tracking systems described in U.S. patent application Ser. No. 13/842,437 (Location Based Tracking System; Inventors: Richard Torgersrud and Christopher Ditto, being filed concurrently herewith). The entire disclosure of the aforementioned U.S. patent application is incorporated herein by reference.

The processing center 150 may connect to the JMS to synchronize some or all of the information associated with each resident, so as to obtain data which can aid in the correct operation of the communications system 25 with respect to facility and court-mandated rules, specific to that facility, and/or rules specific to each resident. Thus, according to one aspect of this disclosure, messages may be automatically generated whenever a calendar date with an event or action pertaining to the resident of the secure facility 100 approaches, or whenever the resident reaches a rehabilitation milestone, as established by the secure facility, such as a change to release date.

Referring again to FIG. 1, requests for communications that are input at the audio/video kiosks 102 are transmitted to the processing center 150, which processes the requests and transmits the requests to the intended recipient(s) 180, 181. The requests may be to initiate an audio and/or video call, initiate a text chat, or schedule a future call or chat with one or more persons 180, 181 residing outside the secure facility 100. In the case of text chats, the requests and subsequent actual chat may be transmitted as an electronic message, such as SMS or MMS messages, via the cellular telephone network directly, or through Internet application programming interfaces (APIs) or other services that relay the messages to the cellular telephone network, and ultimately to the terminal equipment (such as end-user cell phones) 180, 181, and transmit message traffic, requests and/or responses back to the processing center 150.

In a preferred embodiment, the processing center 150, using data provided by the JMS, verifies that all parties involved in communications and requested communications have been authorized to communicate with each other (that is, the resident of the detention facility is authorized to and/or not precluded from communicating with the one or more outside parties) and to communicate at that time, and verifies that the persons communicating are who they claim to be. The requests and/or responses transmitted from the kiosks 102 are then processed on the computing clusters 151, 152, 153, 154 in order to schedule, modify, or cancel future visitations; transmit reminders about account balances, upcoming relevant dates, or other pertinent data, or other notifications.

Although remote video visitations may be scheduled and confirmed on a personal computer, individuals who are outside of secure facilities are not always near such a device, and thus the resident of the secure facility 100 may experience a significant delay in receiving a confirmation of a requested visit. Therefore, it is desirable to transmit visitation requests to a mobile terminal, such as a cell phone or a smart phone. As many people have the cell phones and smart phones turned on and located on or near their person continually, such devices represent an ideal platform with which to confirm a visitation request. For instance, the typically rapid delivery of SMS messages and the concomitant audible or vibratory alerts generated upon their receipt make them an ideal mechanism for reaching the party and thus minimizing delay in confirming visitation requests. Thus, according to one aspect of this disclosure, text messaging may be used to confirm a visitation with a resident of a secure facility.

When the system 25 sends reminder messages of upcoming scheduled visits, an SMS Validity Period attribute is preferably used to cancel message delivery and/or suppress display of messages that have not been received or read, respectively, prior to the scheduled start of the visit. Where available, the SMS message cancel feature may be used to cancel a message that already has been delivered, so that the likelihood of preventing display or receipt of messages past their useful or appropriate time period may be increased. According to one aspect of this disclosure, messages are marked with a validity period or expiration date and time, such that notifications for events that have passed or otherwise expired are not delivered or displayed.

When a reminder of an upcoming scheduled visit is sent in advance of the visit, it may take the form of an enhanced message service (EMS) message, and include a vCalendar entry, which, if supported by the telephony terminal, will cause an electronic event entry to be added to the device's calendar. It may also contain a vCard entry, which likewise will cause an electronic contact (e.g., business card) to be added to the terminal's address book. In other words, according to this disclosure, vCalendar or other electronic calendaring data, vCard or other electronic contact information data, may be distributed. If a reminder of an upcoming visit is sent prior to (or immediately prior to) the visit, at a point where one of the pool of numbers has been assigned to the scheduled visit, the message may include a telephone number at which the connection can be established. If supported by the device, the telephone number may be encoded in the SMS Call Back Number field.

Although the systems described herein preferably use one incoming number nationwide to support incoming telephone call visits at any and all facilities using the service, there may be occasions where it is desirable to direct callers to use different numbers. For instance, if any one person has communicated with more than one resident of detention environments using this service, providing a different direct-dial number specifically for each particular visit will serve to streamline connecting the call, by nature of the system expecting the next call to that number to be from the scheduled visitor and the specific resident.

Because it would be prohibitively expensive to maintain one direct-dial number for each resident of the secure facilities 100, a much smaller pool of unique numbers—enough to cover peak active visits, plus additional numbers as a buffer, may be used. The system temporarily associates one of the direct inward dial (DID) numbers with a particular scheduled call, for the exact duration of the call plus a moderate buffer of time prior to and afterward. During that window of time, only incoming calls with a Caller ID or automatic number identification (ANI) number associated with the account scheduled for the call will actually be connected to the system, except for specified users.

According to another aspect of this disclosure, a message from an outside person may be manually recalled after having been sent. This disclosure is not limited to automated (scheduled) deadlines for deleting messages. For example, where an outside person asks for an electronic visit to occur very soon, but then becomes unavailable (for example, is called into a meeting), that outside person may cancel or change the visit request before the resident of the detention facility sees it.

Because sending an electronic message to the cellular telephone network requires at least one unique ID (typically a mobile telephone number, or sometimes a "short code"), and because these unique IDs are expensive to obtain and maintain, and because using multiple unique IDs for the same service (even if for different purposes) can confuse end-users (because of requiring that multiple address book entries be stored on the device, or multiple numbers for one address book entry), it is preferable to use just one unique ID for all aspects of the service. However, because at least some of the electronic messaging systems (in particular, SMS) do not provide any way to identify which one of several messages the end-user is replying to, a system for uniquely associating end-user replies to a particular query may be required.

According to this disclosure, uniquely associating end-user replies to a particular query can be accomplished by creating one or more random three-digit numbers or keywords to be used as responses by the end-user. The random numbers or keywords may be made to be unique in any rolling 72-hour window, so that multiple threads of requests and responses may be maintained at any one time.

For video visitations using a smart phone as one endpoint of the visit, the text message preferably includes a uniform resource identifier (URI) that is specific to and registered to the application used for visitation, so that the recipient may simply click on a link in the text message to launch the application and initiate the visit. For example, on Apple iOS devices, including the iPhone and iPad, this feature is known as a custom URL scheme. Thus, according to one aspect of this disclosure, a custom Internet address scheme may be configured to launch a specific mobile application with connecting information for a specific video visitation, telephone call, video conference, or other real-time electronic meeting.

Because it is desirable to maintain frequent contact between (1) residents of secure facilities and (2) their friends and family members residing outside such facilities, a system constructed in accordance with this disclosure may keep track of longer-than usual and desired lengths of time between communications, and then automatically generate a proactive reminder, suggesting that a telephone call or video visitation would be helpful. Thus, text messaging may be used to automatically suggest the recipient request a visit with a particular resident whenever a trigger event has occurred, such as when a pre-determined or calculated length of time without visits has elapsed. In addition, messages may be automatically generated when the resident will be unavailable for communications for a period of time. Prior to any text message reminders or requests, however, the system may re-verify that the resident is authorized to interact with the outsider.

Figure 4:
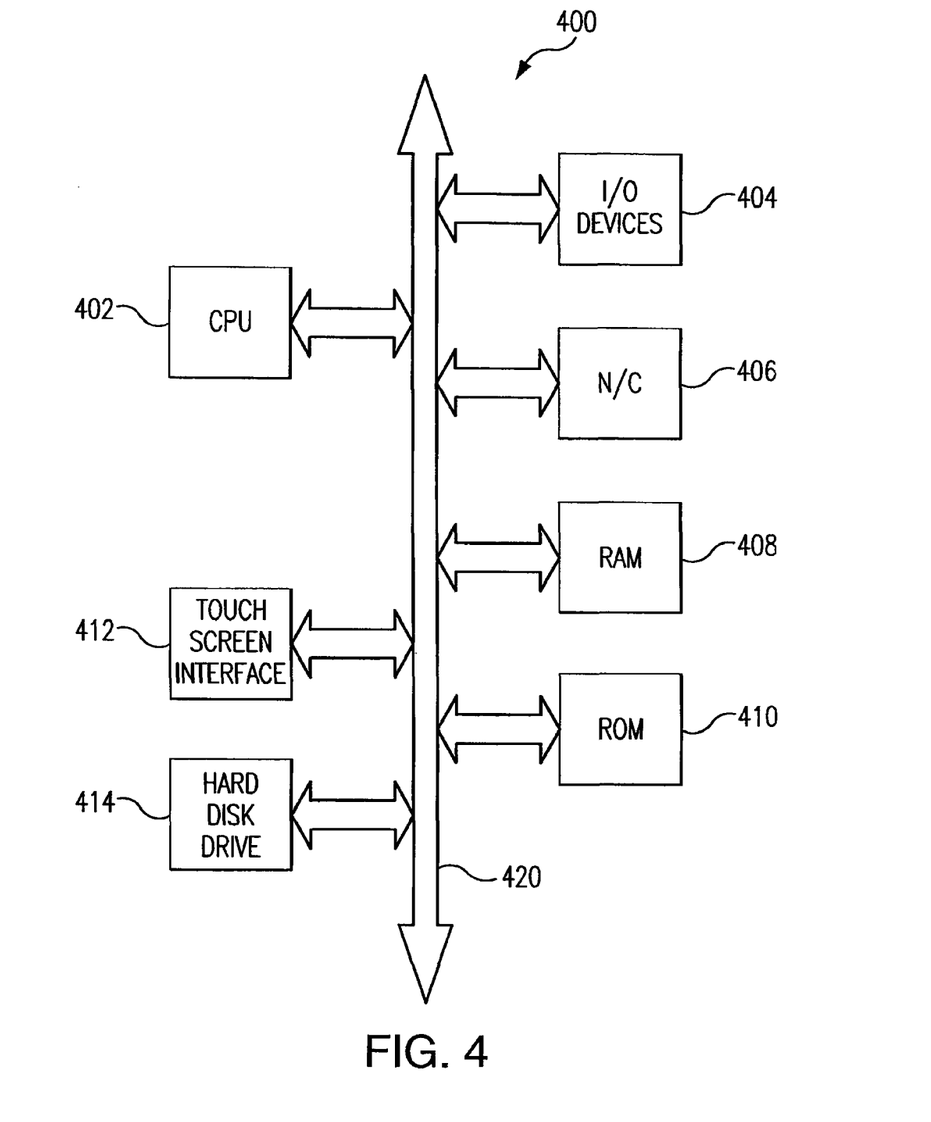
FIG. 4 is a hardware diagram for the communications system of FIG. 1.

FIG. 4 illustrates hardware 400 and other devices that may be employed within the processing center 150. In a preferred embodiment, each cluster 151, 152, 153, 154, has a central processing unit 402 for operating the processing node 256, a touch screen interface 412 and other input-output devices 404, memory devices, including a hard disk drive 414, a read-only memory 410 and a random access memory 408, and a network device 406 for providing communication with other processors and databases within the processing center 150, including the devices within the applications and database nodes 257, 258. In operation, the hardware devices 402, 406, 408, 410, 412, 414 may be operated under the control of the CPU 402 via a suitable bus 420.

While this disclosure provides specific examples and various embodiments, it should be readily understood by those skilled in the art that many modifications and adaptations of the examples and embodiments described herein are possible without departure from the spirit and scope of the invention as claimed hereinafter. Thus, it is to be understood that this disclosure is made only by way of example and not as a limitation on the scope of the invention claimed below.

What is claimed is:

1. A system for originating an electronic communication, said system comprising:
 a terminal located inside a secure facility, wherein the terminal generates the electronic communication and further comprises an interactive audio/video platform;
 a processing center comprising:
   a database for storing data to verify that a resident of the secure facility who originates the electronic communication is authorized to communicate with an intended recipient of the electronic communication, wherein the database stores rehabilitation milestone information established by the secure facility; and
   a processor that receives the data from the database, and to use the data to verify that the resident is authorized to communicate with the intended recipient, wherein the processor generates an electronic message automatically in response to the rehabilitation milestone information; and wherein the processing center converts the electronic message from an electronic messaging format to and from a different format suitable for delivery to and from a terminal located inside the secure facility, and wherein the terminal is used by a resident of the secure facility and others confined within the secure facility, and wherein the processing center verifies that the resident of the secure facility is authorized to communicate with the intended recipient; and wherein the system pushes the electronic communication to the intended recipient only after verifying that the resident is authorized to communicate with the intended recipient.

2. The system of claim 1, where the electronic communication includes a text message, and wherein the system automatically prompts the recipient to request a visit with the resident in response to an occurrence of a time-related trigger event.

3. The system of claim 1, wherein the processor generates messages automatically when the resident will be unavailable for communications for a period of time.

4. The system of claim 1, wherein the database stores monetary threshold information for the resident, and wherein the processor generates a message automatically when an account balance drops below the monetary threshold, the message sent to a non-resident to alert the non-resident of the resident's low-fund balance and that a deposit to the resident is in order.

5. The system of claim 4, wherein the monetary threshold equals a cost of a visit of a specified duration.

6. The system of claim 1, wherein the database stores calendar date information pertaining to the resident, and wherein the processor generates a message automatically based on the calendar date information.

7. The system of claim 1, wherein the electronic communication is marked with a validity period or expiration date and time, such that notifications for events that have passed or expired are not delivered or displayed, or the electronic communication is permitted to be manually recalled or overridden.

8. The system of claim 1, wherein the electronic message contains electronic calendar data or contact information data.

9. The system of claim 1, wherein the electronic message contains an Internet address scheme for launching a mobile application with connecting information for a video visitation, telephone call or video conference.

10. A communications method, comprising:
a communications module generating an electronic message from a person outside a detention environment to a resident of the detention environment;
a processing center converting the electronic message from an electronic messaging format to and from a different format suitable for delivery to and from a terminal located inside the detention environment, and wherein the terminal is used by the resident of the detention environment and others confined within the detention environment and subsequently verifying that the resident of the detention environment is authorized to communicate with the person outside the detention environment, the processing center further comprising a database and a processor, the database storing rehabilitation milestone information established by the detention environment, and the processor generating a message automatically in response to the rehabilitation milestone information; and
subsequently, a transmission module transmitting the electronic message to a terminal located in the detention environment, wherein the terminal further comprises an interactive audio/video platform; and
wherein the electronic message refers to a communication for or with the resident of the detention environment.

11. The method of claim 10, wherein the electronic message includes a request for electronic communication between the resident of the detention environment and the person outside the detention environment.

12. The method of claim 10, further comprising a step of permitting the person outside the detention environment to upload photos, audio or videos to an electronic message board pertaining to the resident of the detention environment.

13. The method of claim 10, further comprising a step of using the processing center to provide funds to the resident of the detention environment via an electronic message.

* * * * *

UNITED STATES PATENT AND TRADEMARK OFFICE
CERTIFICATE OF CORRECTION

PATENT NO. : 9,231,954 B2
APPLICATION NO. : 13/842015
DATED : January 5, 2016
INVENTOR(S) : Richard Torgersrud et al.

It is certified that error appears in the above-identified patent and that said Letters Patent is hereby corrected as shown below:

Under (74) Attorney, Agent or Firm should read --
Venable LLP; Jeffri A. Kaminski; Leslie A. Lee In claim 1, line 66 should read --

A processor that receives the data from the database, and uses the data to verify that the resident is authorized to communicate with the intended recipient, wherein the processor generates an electronic message automatically in response to the rehabilitation milestone information; and Signed and Sealed this
Fourteenth Day of June, 2016

Michelle K. Lee
*Director of the United States Patent and Trademark Office*